US012789172B2

(12) United States Patent
Chae et al.

(10) Patent No.: US 12,789,172 B2
(45) Date of Patent: Nov. 10, 2026

(54) CATALYST FOR DECOMPOSITION OF AMMONIA, MANUFACTURING METHOD THEREFOR, AND METHOD FOR PRODUCING HYDROGEN USING SAME

(71) Applicant: Korea Research Institute of Chemical Technology, Daejeon (KR)

(72) Inventors: Ho Jeong Chae, Daejeon (KR); Youngmin Kim, Daejeon (KR); Thien An Le, Daejeon (KR); Jeong-Rang Kim, Daejeon (KR); Tae Wan Kim, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 38 days.

(21) Appl. No.: 18/759,084

(22) Filed: Jun. 28, 2024

(65) Prior Publication Data

US 2024/0351006 A1 Oct. 24, 2024

Related U.S. Application Data

(60) Division of application No. 18/438,255, filed on Feb. 9, 2024, now Pat. No. 12,251,684, which is a (Continued)

(30) Foreign Application Priority Data

Mar. 15, 2021 (KR) ........................ 10-2021-0033563

(51) Int. Cl.

*B01J 23/63* (2006.01)
*B01J 23/10* (2006.01)
(Continued)

(52) U.S. Cl.

CPC ............... *B01J 23/63* (2013.01); *B01J 23/10* (2013.01); *B01J 37/0236* (2013.01); (Continued)

(58) Field of Classification Search

CPC ........ B01J 23/63; B01J 23/10; B01J 37/0236; B01J 37/031; B01J 37/10; C01B 3/047

See application file for complete search history.

(56) References Cited

U.S. PATENT DOCUMENTS

2014/0322622 A1* 10/2014 Chakraborty ........ B01J 37/0221 423/658.2

FOREIGN PATENT DOCUMENTS

WO 2022055225 A1 3/2022

OTHER PUBLICATIONS

Extended European Search Report issued in corresponding EP Application No. 22771679.2 dated Jul. 9, 2024 (7 pages).

* cited by examiner

*Primary Examiner* — James A Fiorito

(74) *Attorney, Agent, or Firm* — Osha Bergman Watanabe & Burton LLP

(57) ABSTRACT

The present disclosure relates to a catalyst for ammonia decomposition, a manufacturing method therefor, and a method for producing hydrogen using the same. More particularly, the present disclosure relates to a catalyst for ammonia decomposition, a manufacturing method therefor, and a method for producing hydrogen using the same, in which by manufacturing a catalyst for decomposition of ammonia using a solvothermal synthesis method to which alcohol is applied, an ammonia conversion rate can be improved due to excellent catalytic activity in an ammonia decomposition reaction, and hydrogen can be efficiently produced from ammonia due to long-term stability even at a high temperature and for long periods of time.

3 Claims, 7 Drawing Sheets

Related U.S. Application Data continuation of application No. 18/550,906, filed as application No. PCT/KR2022/003391 on Mar. 10, 2022, now abandoned.

(51) Int. Cl.

| | |
|---|---|
| ***B01J 37/02*** | (2006.01) |
| ***B01J 37/03*** | (2006.01) |
| ***B01J 37/10*** | (2006.01) |
| ***C01B 3/047*** | (2026.01) |

(52) U.S. Cl.

CPC ............ *B01J 37/031* (2013.01); *B01J 37/10* (2013.01); *C01B 3/047* (2013.01); *C01B 2203/107* (2013.01)

CATALYST FOR DECOMPOSITION OF AMMONIA, MANUFACTURING METHOD THEREFOR, AND METHOD FOR PRODUCING HYDROGEN USING SAME

CROSS-REFERENCE TO RELATED APPLICATIONS

This Application is a divisional application of U.S. patent application Ser. No. 18/438,255 filed on Feb. 9, 2024, which is a continuation application of U.S. patent application Ser. No. 18/550,906, filed on Feb. 15, 2023, which is a national stage application of PCT International Application No. PCT/KR2022/003391 filed on Mar. 10, 2022, which claims priority to Korean Patent Application No. 10-2021-0033563 filed on Mar. 15, 2021. The contents of these applications are hereby incorporated by reference in their entireties.

TECHNICAL FIELD

The present disclosure relates to a catalyst for ammonia decomposition, a method of manufacturing the same, and a method for producing hydrogen using the same. More particularly, the present disclosure relates to a catalyst for ammonia decomposition, a method of manufacturing the same, and a method for producing hydrogen using the same, which exhibits improved activity and high ammonia conversion.

BACKGROUND ART

One of the most efficient ways to store and transport hydrogen is to use ammonia as a hydrogen source. Since the process of decomposing ammonia into hydrogen and nitrogen is an endothermic process, energy is required to obtain the hydrogen and nitrogen. Existing catalytic decomposition reactions require a considerable amount of heat to obtain a reasonable amount of hydrogen gas and thus incur high costs to produce hydrogen.

$$2NH_3 \rightarrow 3H_2 + N_2 \text{(endothermic reaction)} \quad (1)$$

Ammonia decomposition catalysts are catalysts used to decompose ammonia into nitrogen and hydrogen, and there is a problem in that a very high reaction temperature is required to obtain high-purity hydrogen using the ammonia decomposition catalyst that has been proposed so far.

In addition, in hydrogen production systems using ammonia, the development of high-performance catalysts is important because the residual ammonia concentration must be maintained in the ppm range to maximize the efficiency of the residual ammonia adsorption tower, which is connected after the ammonia cracking reactor.

Therefore, many catalysts with high activity have been studied, but to date, Ru has been reported to have the highest ammonia conversion rate (non-patented literature 1,2).

Japanese Patent Publication No. 6381131 (registered on Aug. 10, 2018) describes a ruthenium supported catalyst in which ruthenium is uniformly supported on a carrier, including basic magnesium carbonate having a high specific surface area and a peak in the pore diameter distribution near 30 Å by precipitating a magnesium compound and a ruthenium compound by alkali metal carbonate in an aqueous solution and subjecting them to drying, calcination, and reduction.

In addition, Korean Patent Application Laid-open Publication No. 10-2021-0007699 (disclosed on Jan. 20, 2021) describes a catalyst for hydrogen production by ammonia decomposition in which a cerium carrier is prepared by calcining a cerium precursor and then immersing, drying, and calcining a ruthenium precursor so that 1 to 10 parts by weight of ruthenium are included per 100 parts by weight of the cerium carrier so that ruthenium having a high activity is substituted into the cerium lattice and has a bonded structure.

However, the above patents attempt to enhance the catalytic activity of Ru by adding other active materials to the catalyst or modifying the carrier and do not attempt to enhance the activity of the catalyst by changing the method of preparing the Ru catalyst as in the present disclosure.

The present disclosure improves a method for manufacturing a catalyst for decomposing ammonia and provides a method for manufacturing a catalyst having a high ammonia decomposition activity compared to a conventional method and a catalyst thereof.

RELATED ART LITERATURE

Patent Literatures (Patent literature 1) Japan Registered Patent Publication No. 6381131 (registered on 2018. 08.10.)

(Patent literature 2) Korean Patent Application Laid-open Publication No. 10-2021-0007699 (disclosed on Jan. 20, 2021.)

Non-Patent Literature (Non-Patent literature 1) Ganley et al., Catalysis Letters, 96 (2004) 117-122

DISCLOSURE

Technical Problem

The main objective of the present disclosure is to provide a catalyst for ammonia decomposition, a method for manufacturing a catalyst for ammonia decomposition that can easily produce a catalyst for ammonia decomposition that exhibits excellent catalytic activity and a high ammonia conversion rate in a reaction to produce hydrogen by ammonia decomposition and a catalyst for ammonia decomposition manufactured by the manufacturing method.

Furthermore, another objective of the present disclosure is to provide a hydrogen production method that can efficiently produce hydrogen from ammonia using the above catalyst for ammonia decomposition.

Technical Solution

To achieve the above objectives, one embodiment of the present disclosure provides a method of manufacturing a catalyst for ammonia decomposition, characterized in that the method includes: (a) preparing a mixture including water, alcohol, an active metal precursor for ammonia decomposition, and a metal oxide; (b) obtaining a solid by solvothermal synthesis of the mixture; and (c) drying the obtained solid.

In one preferred embodiment of the disclosure, the alcohol may be at least one selected from the group consisting of methanol, ethanol, propanol, butanol, glycerol, glycol, ethylene glycol, diethylene glycol, triethylene glycol, butanediol, tetraethylene glycol, propylene glycol, polyethylene glycol, polypropylene glycol, 1,2-pentanediol, and 1,2-hexanediol.

In a preferred embodiment of the disclosure, the active metal for ammonia decomposition may be at least one metal selected from the group consisting of iron (Fe), nickel (Ni), cobalt (Co), platinum (Pt), palladium (Pd), ruthenium (Ru), vanadium (V), copper (Cu), chromium (Cr), tungsten (W), molybdenum (Mo), iridium (Ir), rhodium (Rh), zirconium (Zr), and calcium (Ca).

In one preferred embodiment of the disclosure, the metal oxide in step (a) may be a metal oxide selected from titanium oxide ($TiO_2$), zirconium oxide ($ZrO_2$), silica ($SiO_2$), alumina ($Al_2O_3$), yttria ($Y_2O_3$), cerium oxide ($CeO_2$), lanthanum oxide ($La_2O_3$), magnesia (MgO), tungsten oxide ($WO_3$), calcium oxide (CaO), copper oxide (CuO, $CuO_2$), barium oxide (BaO), or is a composite oxides or solid solution of two or more metal oxides selected from the group.

In one preferred embodiment of the present disclosure, step (a) may be characterized by a volume ratio of alcohol to water of 0.5 to 1.5.

In one preferred embodiment of the present disclosure, the solvothermal synthesis of step (b) may be performed at 120 °C to 200 °C.

Another embodiment of the present disclosure provides a catalyst for ammonia decomposition, characterized in that the catalyst for ammonia decomposition is manufactured by the above method of manufacturing a catalyst for ammonia decomposition and includes an active metal for ammonia decomposition supported on a metal oxide.

In another preferred embodiment of the present disclosure, the active metal for ammonia decomposition may be supported in an amount of from 0.5% to 5% by weight with respect to the total weight of the catalyst for ammonia decomposition.

Another embodiment of the present disclosure provides a method of producing hydrogen from ammonia using a catalyst for ammonia decomposition.

Advantageous Effects

The method for manufacturing a catalyst for ammonia decomposition, according to the present disclosure, can easily produce a catalyst having excellent catalytic activity and exhibiting a high ammonia conversion rate by manufacturing the catalyst using a solvothermal synthesis method with alcohol.

Furthermore, the catalyst for ammonia decomposition manufactured by the method described above has excellent catalytic activity in the ammonia decomposition reaction, which can improve the ammonia conversion rate, and exhibits long-term stability even after high temperature and long time, thereby efficiently producing hydrogen from ammonia.

MODE FOR INVENTION

Unless defined otherwise, all technical and scientific terms used herein have the same meaning as commonly understood by those of ordinary skilled in the art to which this disclosure belongs. In general, the nomenclature used herein is well-known and commonly used in the art.

As used herein, terms such as "includes", "comprises", or "has" refer to the presence of, and refer to, a feature, number, step, operation, component, part, or combination thereof described in the specification. It does not exclude the possibility that other features, figures, steps, operations, components, parts, or combinations thereof may exist or may be added unless otherwise noted.

The present disclosure relates, in one aspect, to a method for manufacturing a catalyst for ammonia decomposition, characterized in that the methods include: (a) preparing a mixture including water, alcohol, an active metal precursor for ammonia decomposition, and a metal oxide; (b) obtaining a solid by solvothermal synthesis of the mixture; and (c) drying the obtained solid.

More specifically, the present inventors confirmed that when a catalyst for ammonia decomposition is manufactured using a solvothermal synthesis method in which alcohol is applied, the activity of the manufactured catalyst is excellent, and the ammonia conversion rate can be improved, resulting in the completion of the present disclosure. In other words, the present disclosure provides a method for manufacturing a catalyst for ammonia decomposition in which a catalyst for ammonia decomposition is manufactured using a solvothermal synthesis method in which alcohol is applied.

Hereinafter, a preferred embodiment of a method for manufacturing a catalyst for ammonia decomposition reaction according to the present disclosure will be described in detail with reference to the accompanying drawings.

Figure 1:
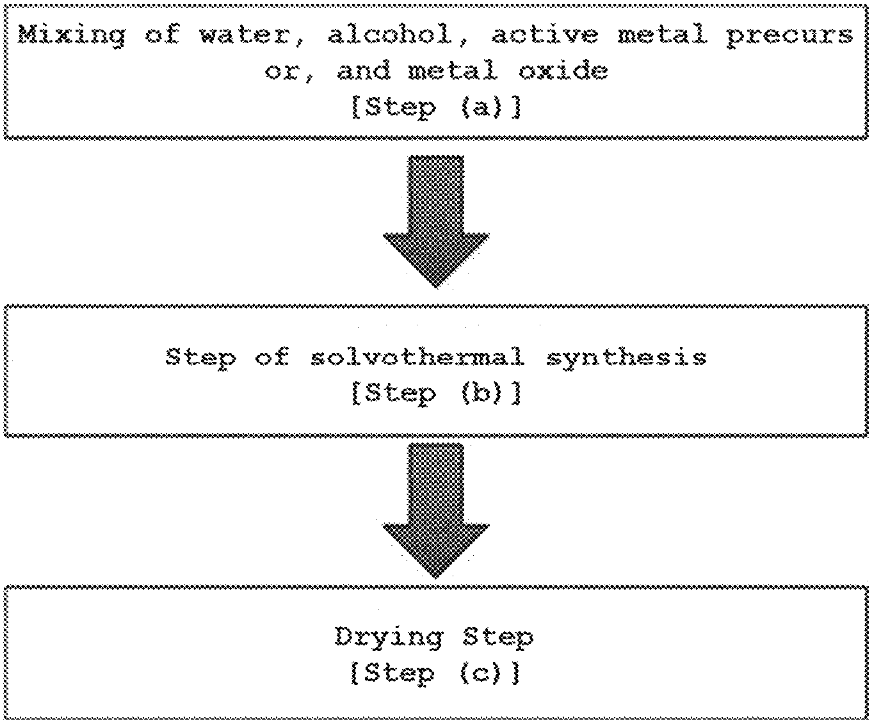
FIG. 1 is a schematic manufacturing process diagram of a catalyst for ammonia decomposition according to one embodiment of the present disclosure.

FIG. 1 is a schematic manufacturing process diagram of a catalyst for ammonia decomposition according to one embodiment of the present disclosure.

Referring to FIG. 1, a method for manufacturing a catalyst for an ammonia decomposition reaction according to one embodiment of the present disclosure first mixes water, alcohol, an active metal precursor for ammonia decomposition, and a metal oxide to obtain a mixture [(step (a)].

In step (a), the mixing of the active metal precursor for decomposing water, alcohol, ammonia, and the metal oxide may be performed at once or may be added separately. For example, an active metal precursor for ammonia decomposition may be added to the water first, followed by adding the alcohol and then mixing the metal oxide.

The active metal for an ammonia decomposition may be at least one metal selected from the group consisting of iron (Fe), nickel (Ni), cobalt (Co), platinum (Pt), palladium (Pd), ruthenium (Ru), vanadium (V), copper (Cu), chromium (Cr), tungsten (W), molybdenum (Mo), iridium (Ir), rhodium (Rh), zirconium (Zr), and calcium (Ca), and preferably ruthenium.

Furthermore, as the active metal precursor for ammonia decomposition, organic compounds and inorganic compounds containing the aforementioned active metal ions can be applied without limitation, and preferably, the active metal for ammonia decomposition may be ruthenium, and the precursor material of the ruthenium may be ruthenium chloride, ruthenium nitride, ruthenium acetylacetonate, ruthenium iodide, and the like, and more preferably, may be ruthenium chlorides such as $RuCl_3 \cdot xH_2O$, $[Ru(NH_3)_6]Cl_3$, and the like.

In this case, the active metal precursor for ammonia decomposition may be mixed with 1 part to 10 parts by weight of the metal with respect to 100 parts by weight of the metal oxide described herein. When the active metal precursor for ammonia decomposition is mixed with less than 1 part by weight per 100 parts by weight of metal oxide, the activity of the ammonia decomposition reaction is reduced due to the decrease in the supporting amount of active metal for ammonia decomposition, and when the supporting amount of active metal for ammonia decomposition exceeds 10 parts by weight, the manufacturing cost is increased due to the increase in the supporting amount of active metal for ammonia decomposition, and the activity of the ammonia decomposition reaction is reduced due to the agglomeration of active metal particles.

In addition, the alcohol prevents the active metal nanoparticles for ammonia decomposition from agglomerating and reduces the ammonia decomposition active metal while increasing the dispersion, and the alcohol can be applied with no limitation as long as a hydroxy group is bonded to a saturated carbon atom. Specifically, the alcohol may be at least one selected from the group consisting of methanol, ethanol, propanol, butanol, glycerol, glycol, ethylene glycol, diethylene glycol, triethylene glycol, butanediol, tetraethylene glycol, propylene glycol, polyethylene glycol, polypropylene glycol, 1,2-pentanediol, and 1,2-hexanediol, and preferably may be propanol, diethylene glycol, and ethylene glycol.

In this case, the alcohol may have a volume ratio of alcohol to water of 0.5 to 1.5, preferably 1. When the volume ratio of the alcohol to water is less than 0.5, it is not possible to prevent the ammonia decomposition active metal particles from agglomerating, and at the same time, the reduction rate of the ammonia decomposition active metal may decrease, resulting in a decrease in the activity of the ammonia decomposition reaction, and when the volume ratio exceeds 1.5, a problem such as a long reaction time or poor crystallinity may occur.

Furthermore, the method for manufacturing the catalyst for ammonia decomposition according to the present disclosure may further mix a stabilizer with the active metal precursor for ammonia decomposition and an alcohol to improve the dispersion of the active metal nanoparticles for ammonia decomposition.

The stabilizer is a water-soluble polymer used to improve the dispersion of the active metal nanoparticles for ammonia decomposition, and although water-soluble polymers having various molecular weights are variously applicable in terms of improving the dispersion of the active metal nanoparticles for ammonia decomposition, the water-soluble polymer may preferably have a weight-average molecular weight (Mw) of 1,000 Da to 400,000 Da, and more preferably have a weight-average molecular weight (Mw) of 10,000 Da to 80,000 Da. At this time, the weight-average molecular weight is the molecular weight measured by gel permeation chromatography (GPC) at room temperature.

The stabilizer may be polyvinylpyrrolidone (PVP), vinylpyrrolidone-containing copolymers, cetrimonium bromide (CTAB), sodium dodecyl sulfate (SDS), polyvinyl alcohol (PVA), polyoxyethylene, and a mixture thereof, and in terms of improving the dispersion of active metal nanoparticles for ammonia decomposition, polyvinylpyrrolidone is useful.

By dispersing the active metal nanoparticles for ammonia decomposition uniformly by mixing alcohol in this way, a catalyst with active metal for ammonia decomposition uniformly dispersed on the carrier can be manufactured.

On the other hand, the metal oxide plays the role of evenly dispersing and supporting the active metal for ammonia decomposition, which can limit the agglomeration effect of the catalytic active material particles due to the strong catalytic active material-carrier interaction in the high temperature of ammonia dehydrogenation decomposition reaction. The metal oxide can provide sufficient electron density to the active metal for ammonia decomposition, thereby improving the catalytic activity and improving the thermal stability and durability, which is effective for improving the ammonia decomposition activity, especially for improving the persistence of the decomposition activity during long time use.

The metal oxide may be a metal oxide selected from, but not limited to, among titanium oxide ($TiO_2$), zirconium oxide ($ZrO_2$), silica ($SiO_2$), alumina ($Al_2O_3$), yttria ($Y_2O_3$), cerium oxide ($CeO_2$), lanthanum oxide ($La_2O_3$), magnesia (MgO), tungsten oxide ($WO_3$), calcium oxide (CaO), copper oxide (CuO, $CuO_2$), barium oxide (BaO), or a composite oxide or solid solution of two or more of these metal oxides, preferably cerium oxide, lanthanum oxide, and solid solutions thereof.

The mixture mixed with the metal oxide can perform stirring, and sonication so that the active metal for ammonia decomposition is uniformly dispersed on the metal oxide, and a precipitating agent, such as sodium hydroxide (NaOH) can be further added to promote catalyst formation. In this case, the precipitating agent may be sodium hydroxide, aqueous ammonia, urea, potassium hydroxide, or the like. At this time, the amount of the precipitating agent may be 1 to 10 moles per mole of the active metal for decomposing ammonia added.

Then, the mixture is solvothermal synthesized to obtain a solid [step (b)].

The solvothermal synthesis may be performed at a temperature of 120 °C to 200 °C for a predetermined time, for example, 4 hours to 24 hours. When the solvothermal synthesis temperature is less than 120 °C, the precursor may not be sufficiently reduced due to the low reaction temperature, resulting in a decrease in yield, and when the temperature is greater than 200 °C, there may be problems with particle agglomeration or enlargement due to the high temperature.

The solids precipitated in the reactants by solvothermal synthesis as described above are obtained and sufficiently dried using known methods and devices, such as vacuum ovens, hot air, constant temperature and humidity, microwaves, and the like to manufacture the catalyst for ammonia decomposition [step (d)].

In addition, after drying, reduction may be performed using a reducing gas such as hydrogen or ammonia to additionally activate the catalyst.

In another aspect, the present disclosure relates to a catalyst for ammonia decomposition in which the catalyst is manufactured according to the method for manufacturing a catalyst for ammonia decomposition and includes an active metal for ammonia decomposition supported on a metal oxide and to a method for producing hydrogen from ammonia using the catalyst for ammonia decomposition.

A catalyst for ammonia decomposition manufactured by the manufacturing method of the present disclosure has improved catalytic activity, thermal stability, and durability due to the higher dispersion of the active metal for ammonia decomposition and the strong interaction (SMSI) effect between the active metal for ammonia decomposition and the carrier metal oxide. Therefore, the catalyst can improve the ammonia conversion rate in the ammonia decomposition reaction and exhibit long-term stability even after high temperatures and long time.

A catalyst for ammonia decomposition may contain from 0.5% to 5% by weight of the active metal for ammonia decomposition with respect to the total weight of the catalyst for ammonia decomposition. In the catalyst for ammonia decomposition, when an active metal for ammonia decomposition is contained in less than 0.5% by weight of the total weight of the catalyst for ammonia decomposition, a problem may occur that the activity of the ammonia decomposition reaction is not sufficiently high due to a decrease in the density of the active metal for ammonia decomposition that acts as an active point, and when the active metal for ammonia decomposition exceeds 5% by weight, a problem may occur that the manufacturing cost is high in relation to the effectiveness.

Furthermore, the method of producing hydrogen, according to the present disclosure, can treat ammonia-containing gas by using a catalyst including an active metal for ammonia decomposition supported on a metal oxide, and can produce hydrogen by dehydrogenating and decomposing the ammonia into nitrogen and hydrogen.

The catalyst for ammonia decomposition may exhibit an ammonia conversion rate of 98% or more at a temperature in a temperature range of 400 °C to 500 °C, and more specifically, may exhibit an ammonia conversion rate of 100% at in a temperature range of 500 °C.

Hereinafter, the present disclosure will be described in more detail with reference to a specific example. The following examples are merely illustrative to help the understanding of the present disclosure, and the scope of the present disclosure is not limited thereto.

Example 1: Manufacturing of Catalysts Using Alcohol-Assisted Solvothermal Method 0.04 g of $RuCl_3 \cdot xH_2O$ (Sigma, 99.98%) was added to 35 ml of deionized water, followed by adding 35 ml of ethylene glycol (99.8%; Sigma) and stirring for 30 min. Subsequently, 1.0 g of $CeO_2$ (Sigma, 99.95%) was added to the mixture and sonicated for 30 minutes. Then, 6 ml of 0.5M NaOH diluted with 10 g of NaOH (Daejung, 97%, precipitating agent) in 500 ml of deionized water was added to the mixture and stirred for 30 minutes. The stirred mixture was transferred to a 100 ml Teflon-lined autoclave, heated to 160 °C, and maintained at the temperature for 8 hours to proceed with the reaction. The resulting precipitate was then collected, washed several times with deionized water and ethanol, and dried in a vacuum oven at 110 °C for 12 hours to prepare a catalyst for ammonia decomposition containing 1.4% by weight of ruthenium.

Example 2 to 18: Manufacturing of Catalysts Using Alcohol-Assisted Solvothermal Method A catalyst for ammonia decomposition was manufactured in the same manner as in Example 1, except that the catalyst was prepared under the conditions shown in Table 1.

[Example 19] Manufacturing of Catalysts Using Alcohol-Assisted Solvothermal Method 0.04 g of $RuCl_3 \cdot xH_2O$ (Sigma, 99.98%) was added to 35 ml of deionized water, followed by adding 35 ml of ethylene glycol (99.8%; Sigma) and stirring for 30 min. Subsequently, 0.21 g of polyvinylpyrrolidone (PVP, Sigma, average mol wt. 40,000) was added to the above mixture, and stirring was performed for 30 minutes, followed by 1.0 g of $CeO_2$ (Sigma, 99.95%) was added to the mixture and sonicated for 30 minutes. Then, 6 ml of 0.5M NaOH diluted with 10 g of NaOH (Daejung, 97%, precipitating agent) in 500 ml of deionized water was added to the mixture and stirred for 30 minutes. The stirred mixture was transferred to a 100 ml Teflon-lined autoclave, heated to 160 °C, and maintained at the temperature for 8 hours to proceed with the reaction. The resulting precipitate was then collected, washed several times with deionized water and ethanol, and dried in a vacuum oven at 110 °C for 12 hours to prepare a catalyst for ammonia decomposition containing 1.4% by weight of ruthenium.

Example 20 to 24: Manufacturing of Catalysts Using Alcohol-Assisted Solvothermal Method The catalyst for ammonia decomposition was manufactured in the same manner as in Example 1, except that the catalyst was prepared under the conditions shown in Table 1.

TABLE 1

| Division | Alcohol | Synthesis Temperature (° C.) | Synthesis Time (hr) | Stabilizer | Precipitating agent | Ratio of alcohol by volume to deionized water |
|---|---|---|---|---|---|---|
| Example 1 | Ethylene glycol | 160 | 8 | — | NaOH | 1 |
| Example 2 | Ethylene glycol | 120 | 8 | — | NaOH | 1 |
| Example 3 | Ethylene glycol | 200 | 8 | — | NaOH | 1 |
| Example 4 | Diethylene glycol | 120 | 8 | — | NaOH | 1 |
| Example 5 | Diethylene glycol | 160 | 8 | — | NaOH | 1 |
| Example 6 | Diethylene glycol | 200 | 8 | — | NaOH | 1 |
| Example 7 | Propylene glycol | 120 | 8 | — | NaOH | 1 |
| Example 8 | Propylene glycol | 160 | 8 | — | NaOH | 1 |
| Example 9 | Propylene glycol | 200 | 8 | — | NaOH | 1 |

TABLE 1-continued

| Division | Alcohol | Synthesis Temperature (° C.) | Synthesis Time (hr) | Stabilizer | Precipitating agent | Ratio of alcohol by volume to deionized water |
|---|---|---|---|---|---|---|
| Example 10 | Glycerin | 120 | 8 | — | NaOH | 1 |
| Example 11 | Glycerin | 160 | 8 | — | NaOH | 1 |
| Example 12 | Glycerin | 200 | 8 | — | NaOH | 1 |
| Example 13 | 2-Propanol | 120 | 8 | — | NaOH | 1 |
| Example 14 | 2-Propanol | 160 | 8 | — | NaOH | 1 |
| Example 15 | 2-Propanol | 200 | 8 | — | NaOH | 1 |
| Example 16 | Ethanol | 120 | 8 | — | NaOH | 1 |
| Example 17 | Ethanol | 160 | 8 | — | NaOH | 1 |
| Example 18 | Ethanol | 200 | 8 | — | NaOH | 1 |
| Example 19 | Ethylene glycol | 160 | 8 | PVP | NaOH | 1 |
| Example 20 | Ethylene glycol | 160 | 8 | — | Urea | 1 |
| Example 21 | Ethylene glycol | 160 | 8 | — | $NH_4OH$ | 1 |
| Example 22 | Ethylene glycol | 160 | 8 | — | — | 1 |
| Example 23 | Ethylene glycol | 160 | 2 | — | NaOH | 1 |
| Example 24 | Ethylene glycol | 160 | 24 | — | NaOH | 1 |

[Example 25] Manufacturing of Catalysts Using Alcohol-Assisted Solvothermal Method A catalyst for ammonia decomposition was manufactured in the same manner as in Example 1, except that 0.02 g of $RuCl_3 \cdot xH_2O$ (Sigma, 99.98%) was added to 35 ml of deionized water, and then 35 ml of ethylene glycol (99.80%; Sigma) was added and stirred for 30 minutes. Subsequently, 1.0 g of $CeO_2$ (Sigma, 99.95%) was added to the above mixture to prepare a catalyst for ammonia decomposition containing 0.7% by weight of ruthenium.

[Example 26] Manufacturing of Catalysts Using Alcohol-Assisted Solvothermal Method A catalyst for ammonia decomposition was manufactured in the same manner as in Example 1, except that 0.2 g of $RuCl_3 \cdot xH_2O$ (Sigma, 99.98%) was added to 35 ml of deionized water, and then 35 ml of ethylene glycol (99.8%; Sigma) was added and stirred for 30 minutes. Subsequently, 1.0 g of $CeO_2$ (Sigma, 99.95%) was added to the above mixture to prepare a catalyst for ammonia decomposition containing 2.7% by weight of ruthenium.

Comparative Example 1: Manufacturing of Catalysts Using Wet-Impregnation 0.04 g of $RuCl_3 \cdot xH_2O$ (Sigma, 99.98%) was added to 50 ml of deionized water and stirred for 30 minutes. 1.0 g of $CeO_2$ (Sigma, 99.95%) was added to the solution, and stirring was continued for 30 minutes. Thereafter, the mixture was aged in a Rotavapor (R-205, Buchi) at 60 °C at a stirring speed of 150 rpm for 4 hours, and then water was evaporated at 60 °C under 72 mbar pressure for 1 hour to obtain a solid. The obtained solids were dried at 110 °C for 12 hours and then calcined in air at 500 °C for 3 hours to prepare a catalyst for ammonia decomposition containing 1.5% by weight of ruthenium with respect to the total weight of the catalyst.

Comparative Example 2: Manufacturing of Catalysts Using Wet-Impregnation 0.04 g of $RuCl_3 \cdot xH_2O$ (Sigma, 99.98%) was added to 1.0 g of $CeO_2$ (Sigma, 99.95%) suspended in 50 ml of deionized water. The pH of the suspension was adjusted to 9.0 using 0.5 M $NH_4OH$ [dilute 16.3 ml of $NH_4OH$ (Samchun, 28% to 30%) in deionized water to obtain 0.5 L of the final solution]. The generated suspension was aged at room temperature for 12 hours with stirring at a speed of 400 rpm to generate a precipitate. The generated precipitate was separated by filtration, then washed with deionized water and ethanol, and dried at 110 °C for 12 hours to prepare a catalyst for ammonia decomposition containing 1.5% by weight of ruthenium with respect to the total weight of the catalyst.

<Comparative Example 3: Manufacturing of Catalysts Using Alcohol-Reflux 0.04 g of $RuCl_3 \cdot xH_2O$ (Sigma, 99.98%) was added to ethylene glycol (Sigma, 99.8%) under stirring, and then 1 g of $CeO_2$ (Sigma, 99.95%) was added to the mixture, and stirring was continued for 30 minutes. Thereafter, 0.12 g of NaOH (Daejung, 97%) was added to the mixture, and stirring was continued for 30 minutes, followed by refluxing at 160 °C for 3 hours. The generated suspension was aged at room temperature for 12 hours with stirring at a speed of 400 rpm to generate a precipitate. The generated precipitate was separated by filtration, then washed with deionized water and ethanol, and dried at 110 °C for 12 hours to prepare a catalyst for ammonia decomposition containing 1.0% by weight of ruthenium with respect to the total weight of the catalyst.

Comparative Example 4: Manufacturing of Catalysts Using Hydrothermal Method 0.04 g of $RuCl_3 \cdot xH_2O$ (Sigma, 99.98%) was added to 50 ml of deionized water and stirred for 30 min, then 1.0 g of $CeO_2$ (Sigma, 99.95%) was added to the solution, and stirring was continued for 30 minutes. Then, the mixture was transferred to a 75 ml Teflon-lined autoclave, heated to 160 °C, and maintained at 160 °C for 8 hours. The precipitate generated from the above reaction was collected, washed several times with deionized water and ethanol, and dried in a vacuum oven at 110 °C for 12 hours to prepare a catalyst for ammonia decomposition containing 1.4% by weight of ruthenium with respect to the total weight of the catalyst.

Comparative Example 5: Manufacturing of Catalysts Using Solvothermal Method

A catalyst for ammonia decomposition was prepared in the same manner as in Example 1, except that instead of using deionized water, 100 vol % ethylene glycol was used to prepare the catalyst for ammonia decomposition containing 0.6% by weight of ruthenium.

Experimental Example 1: Measurement of the Ammonia Conversion Rate of a Catalyst According to Manufacturing Method Each ammonia dehydrogenation decomposition reaction was performed using the catalysts prepared in Example 1 and Comparative Examples 1 to 5, and the ammonia conversion rate was measured. The ammonia decomposition ability was measured under at a spatial velocity of 6,000 ml/gcat·/h at atmospheric pressure at reaction temperatures of 300 °C, 350 °C, 400 °C, 450 °C, and 500 °C, and the ammonia conversion rate was calculated using Formula 1 shown below. The results are shown in Table 2 and FIG. 2.

[Formula 1]

$$\text{Ammonia conversion rate (\%)} = [(\text{ammonia concentration at reactor inlet}) - (\text{ammonia concentration at reactor outlet})/(\text{ammonia concentration at reactor inlet})] \times 100$$

TABLE 2

| | Ammonia conversion rate (%) according to temperature | | | | |
|---|---|---|---|---|---|
| Division | 300° C. | 350° C. | 400° C. | 450° C. | 500° C. |
| Example 1 | 5.9 | 23.3 | 61.5 | 97.2 | 100 |
| Comparative Example 1 | 4.0 | 16.8 | 47.9 | 89.6 | 100 |
| Comparative Example 2 | 4.7 | 17.8 | 50.6 | 91.6 | 100 |
| Comparative Example 3 | 4.6 | 18.7 | 50.4 | 89.8 | 100 |
| Comparative Example 4 | 3.9 | 17.7 | 50.4 | 90.6 | 100 |
| Comparative Example 5 | 4.8 | 16.9 | 43.0 | 80.7 | 99.4 |

Figure 2:
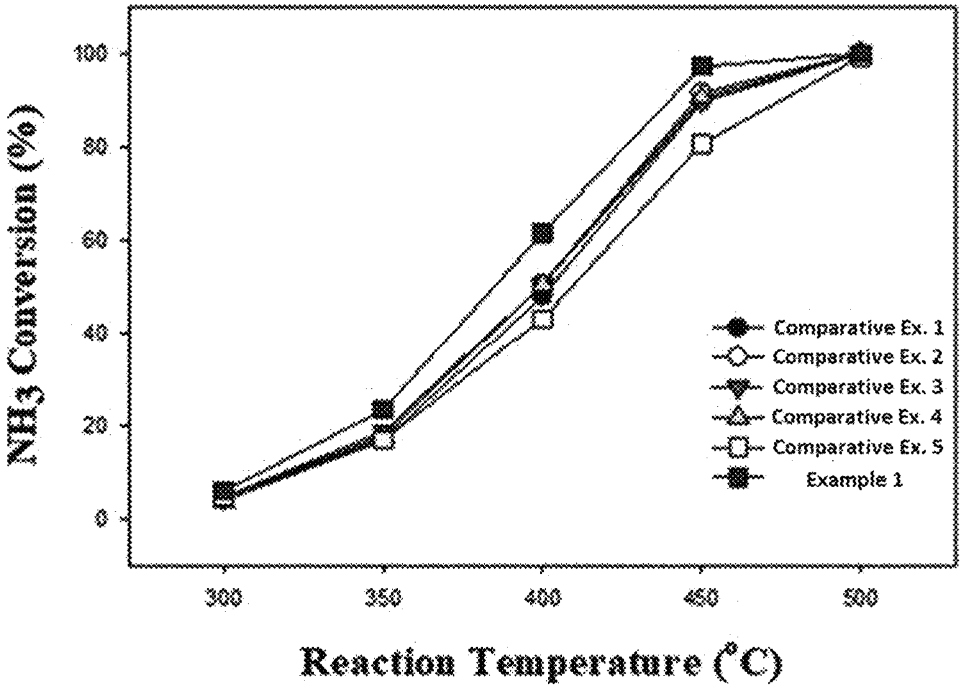
FIG. 2 is a graph of the ammonia conversion rate measurement results of the catalyst manufactured in Example 1 and Comparative Examples 1 to 5 of the present disclosure.

As shown in Table 2 and FIG. 2, the catalyst prepared in Example 1 exhibited superior ammonia decomposition ability compared to the catalysts of Comparative Examples 1 to 5 over the entire range of temperatures below 450 °C

Experimental Example 2: Measurement of the Ammonia Conversion Rate According to Alcohol Under the same conditions, the ammonia dehydrogenation decomposition reactions were performed using the catalysts of Examples 1 to 18 prepared by varying only the type of alcohol, and the ammonia conversion rate was measured. The ammonia decomposition ability was measured at a spatial velocity of 6,000 ml/gcat·/h at atmospheric pressure at reaction temperatures of 300 °C, 350 °C, 400 °C, 450 °C, and 500 °C, and the ammonia conversion rate was calculated using Formula 1 shown below. The results are shown in Table 3 and FIG. 3.

TABLE 3

| | | Ammonia conversion rate (%) according to temperature | | | | |
|---|---|---|---|---|---|---|
| Division | Alcohol | 300 °C | 350 °C | 400 °C | 450 °C | 500 °C |
| Example 3 | Ethylene glycol | 5.7 | 25.1 | 65.3 | 98.4 | 100 |
| Example 5 | Diethylene glycol | 6.8 | 26.4 | 65.5 | 98.3 | 100 |
| Example 13 | 2-Propanol | 8.8 | 28.7 | 62.7 | 93.0 | 100 |

Figure 3:
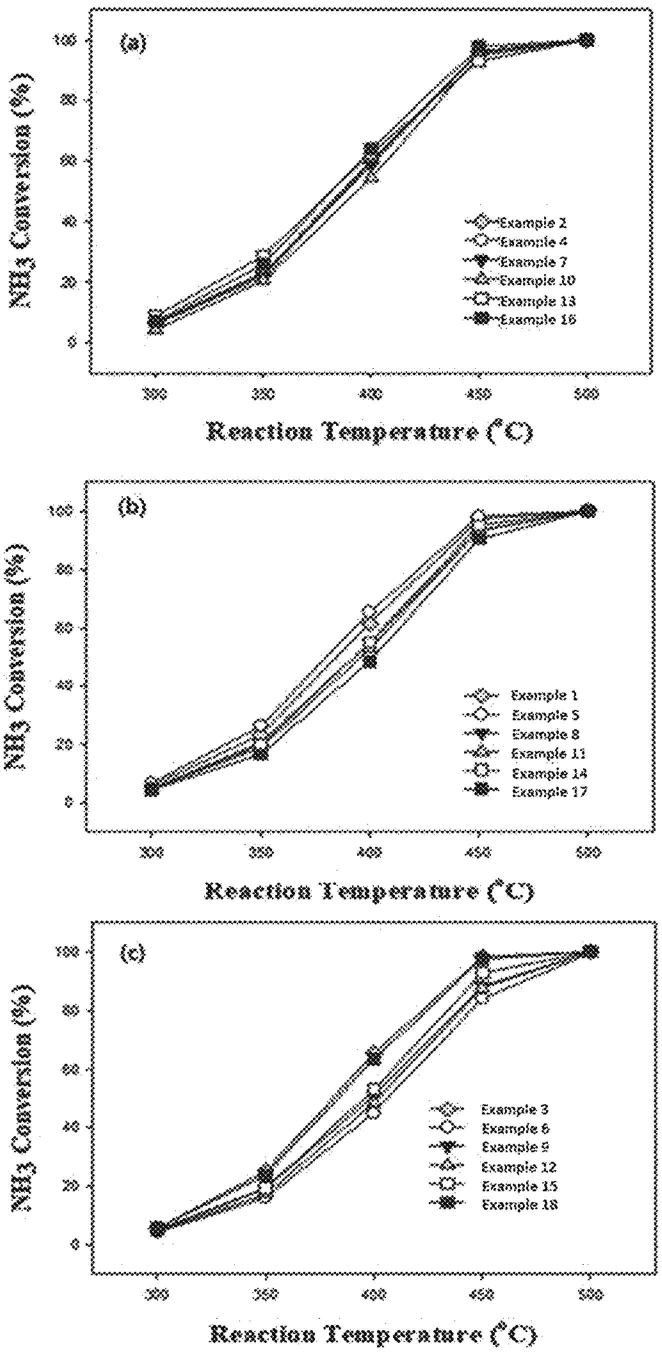
FIG. 3 is a graph of ammonia conversion rate measurement results of catalysts manufactured in Examples 1 to 18 of the present disclosure, in which (a) to (c) are ammonia conversion rate measurement results of catalysts manufactured by varying the alcohol while the solvothermal synthesis temperature is fixed, and (d) to (f) are ammonia conversion rates of catalysts manufactured by varying the solvothermal synthesis temperature while the alcohol is fixed.

As shown in Table 3 and FIG. 3, the ammonia decomposition ability varied depending on the type of alcohol applied and the synthesis temperature in the preparation of the catalysts. In particular, the catalyst of Example 13 with 2-propanol at a synthesis temperature of 120 °C had a high ammonia conversion rate, the catalyst of Example 5 with diethylene glycol at a synthesis temperature of 160 °C had a high ammonia conversion rate, and the catalyst of Example 3 with ethylene glycol at a synthesis temperature of 200 °C had a high ammonia conversion rate. The results of the catalysts prepared by using the same alcohol and changing the synthesis temperature are shown in (a) to (c) of FIG. 3. It was confirmed that the optimum synthesis temperature existed depending on the type of alcohol used.

Experimental Example 3: Measurement of the Ammonia Conversion Rate According to Using Stabilizer Under the same conditions, ammonia dehydrogenation decomposition reactions were performed using each catalyst of Examples 1 and 19 prepared with and without a stabilizer to measure the ammonia conversion rate. The ammonia decomposition ability was measured at a spatial velocity of 6,000 ml/gcat·/h at atmospheric pressure at reaction temperatures of 300 °C, 350 °C, 400 °C, 450 °C, and 500 °C, and the ammonia conversion rate was calculated using Formula 1 shown below. The results are shown in FIG. 4.

Figure 4:
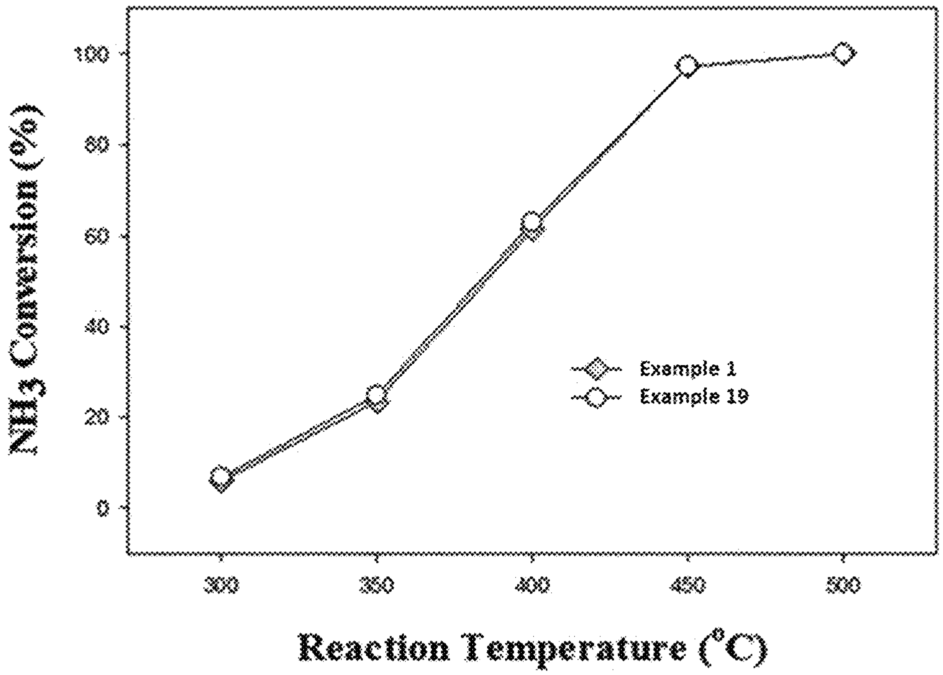
FIG. 4 is a graph of ammonia conversion rate measurement results for catalysts manufactured in Examples 1 and 19 of the present disclosure.

As shown in FIG. 4, the catalyst of Example 19 using a stabilizer has a slightly higher in ammonia conversion rate at a lower temperature than Example 1 without using a stabilizer, but the ammonia conversion rate was similar at a higher temperature. Accordingly, it was found that not using a stabilizer is preferable in terms of manufacturing cost.

Experimental Example 4: Measurement of the Ammonia Conversion Rate According to Using a Precipitating Agent Under the same conditions, each ammonia dehydrogenation decomposition reaction was performed using the catalysts of the Examples prepared according to the type of a precipitating agent and with or without precipitating agent, and the ammonia conversion rate was measured. The ammonia decomposition ability was measured at a spatial velocity of 6,000 ml/gcat·/h at atmospheric pressure at reaction temperatures of 300 °C, 350 °C, 400 °C, 450 °C, and 500 °C, and the ammonia conversion rate was calculated using Formula 1 shown below. The results are shown in FIG. 5.

Figure 5:
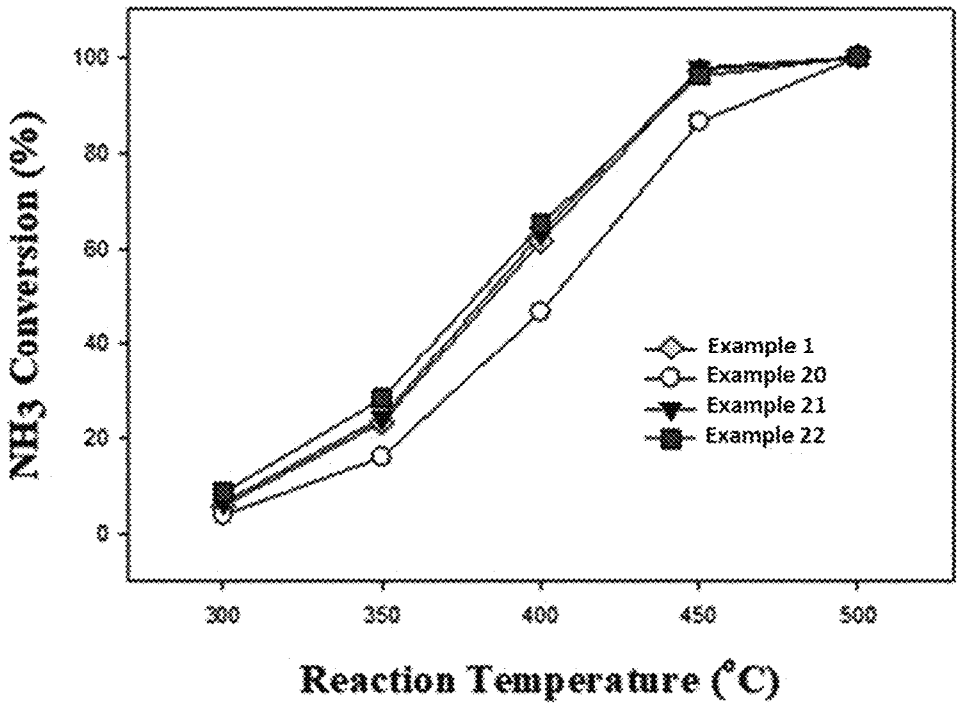
FIG. 5 is a graph of ammonia conversion rate measurement results of catalysts manufactured in Examples 1, 20, and 22 of the present disclosure.

As shown in FIG. 5, the catalyst of Example 22 without a precipitating agent was found to have a higher ammonia conversion rate compared to Examples 1, 20, and 21 with precipitating agents, and among the precipitating agents, the catalyst prepared using NaOH and $NH_4OH$ had a higher ammonia conversion rate than urea.

Experimental Example 5: Measurement of the Ammonia Conversion Rate According to Synthesis Conditions Under the same conditions, each ammonia dehydrogenation decomposition reaction was performed using the catalyst of the Examples prepared according to the synthesis time, and the ammonia conversion rate was measured. The ammonia decomposition ability was measured at a spatial velocity of 6,000 ml/gcat·/h at atmospheric pressure at reaction temperatures of 300 °C, 350 °C, 400 °C, 450 °C, and 500 °C, and the ammonia conversion rate was calculated using Formula 1 shown below. The results are shown in FIG. 6.

Figure 6:
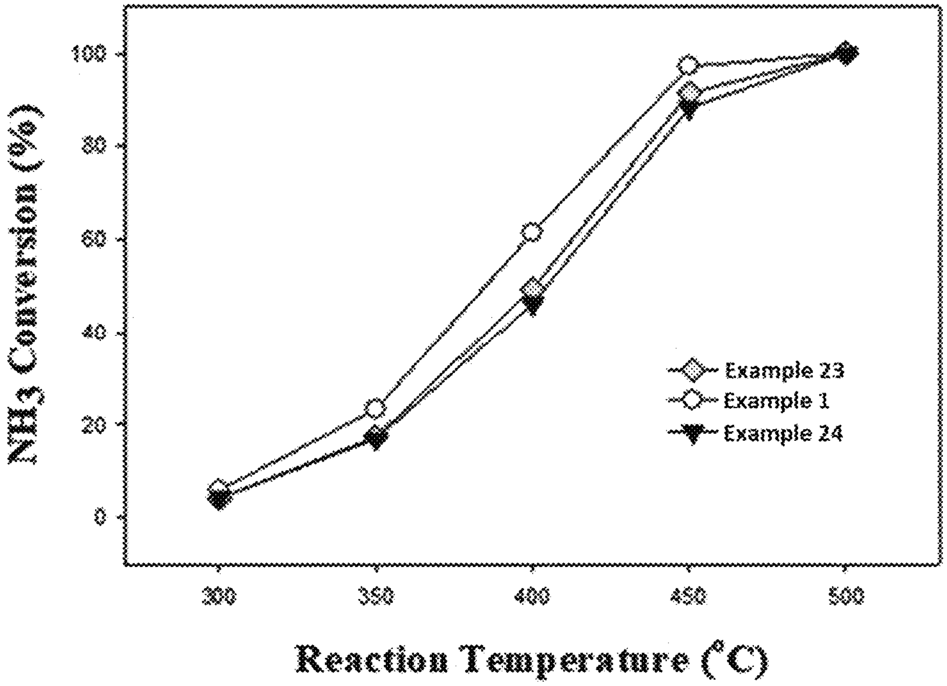
FIG. 6 is a graph of ammonia conversion rate measurement results of catalysts manufactured in Examples 1, 23, and 24 of the present disclosure.

As shown in FIG. 6, the catalyst of Example 1 prepared by solvothermal synthesis for 8 hours, showed a higher ammonia conversion rate compared to the catalysts of Examples 23 and 24 prepared by solvothermal synthesis for 2 hours and 24 hours, respectively.

Experimental Example 6: Measurement of the Ammonia Conversion Rate According to Ruthenium Content Under the same conditions, each ammonia dehydrogenation decomposition reaction was performed using the catalyst of the Examples prepared with different ruthenium content, and the ammonia conversion rate was measured. The ammonia decomposition ability was measured at a spatial velocity of 6,000 ml/gcat·/h at atmospheric pressure at reaction temperatures of 300 °C, 350 °C, 400 °C, 450 °C, and 500 °C, and the ammonia conversion rate was calculated using Formula 1 shown below. The results are shown in FIG. 7.

Figure 7:
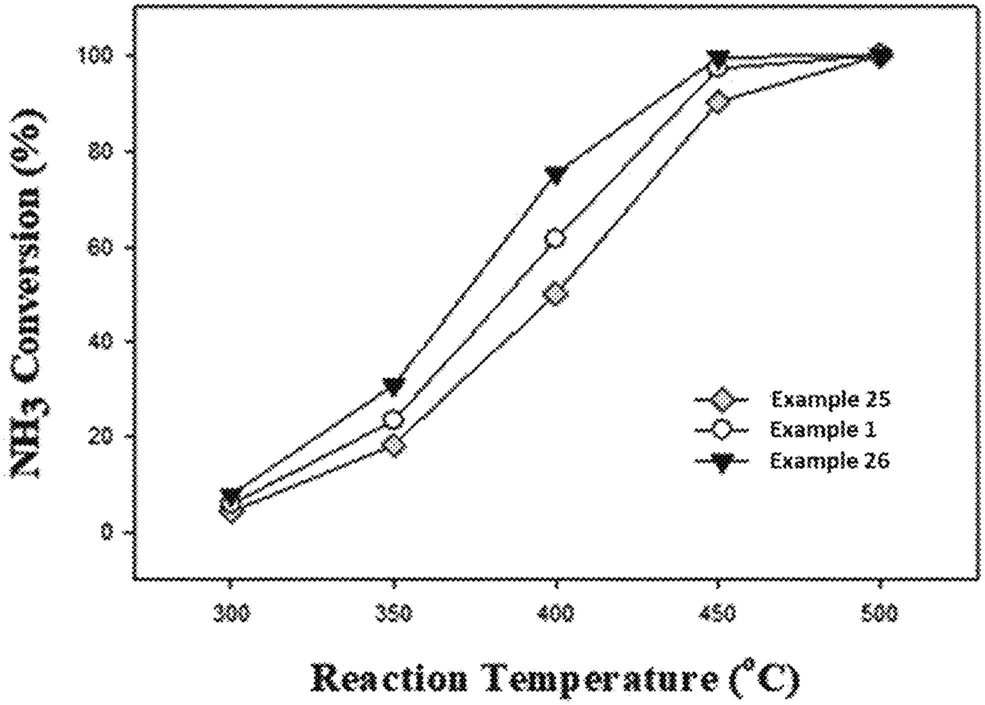
FIG. 7 is a graph of ammonia conversion rate measurement results of catalysts manufactured in Examples 1, 25, and 26 of the present disclosure.

As shown in FIG. 7, it was confirmed that the ammonia conversion rate increased as the ruthenium content increased from 0.7% to 2.7% by weight with respect to the total weight of the catalyst. Thus, it was indirectly confirmed that the catalysts, according to the present disclosure, when prepared by the method of the present disclosure, can be evenly dispersed with Ru metal up to 2.7% by weight in the ceria support.

Therefore, it was confirmed that the catalyst for ammonia decomposition, according to the present disclosure, has excellent catalytic activity in the ammonia decomposition reaction, which can improve the ammonia conversion rate, and exhibits long-term stability even after high temperatures and long time.

Although the present disclosure has been described with reference to the embodiments, other embodiments may be configured within the spirit and scope of the present disclosure.

Accordingly, the scope of the present disclosure is defined only by the appended claims and their equivalents and is not limited by the specific embodiments described herein.

The invention claimed is:

1. An ammonia decomposition catalyst manufactured by a method for manufacturing a catalyst for ammonia decomposition, the method comprising:

(a) preparing a mixture comprising water, alcohol, an active metal precursor for ammonia decomposition, and a metal oxide;

(b) obtaining a solid by subjecting the mixture to solvothermal synthesis using water and alcohol and (c) drying the obtained solid, wherein in the (a), the content of the active metal precursor for ammonia decomposition is in a range of 1 to 20 parts by weight with respect to 100 parts by weight of the metal oxide, and the volume ratio of the alcohol to the water is in a range of 0.5 to 1.5, wherein in the (b), the solvothermal synthesis is performed at a temperature in a range of 120 °C to 200 °C, and wherein the ammonia decomposition catalyst comprises an ammonia decomposition active metal supported on a metal oxide.

2. The ammonia decomposition catalyst of claim 1, wherein the active metal is supported in an amount of 0.5% to 5% by weight with respect to the total weight of the ammonia decomposition catalyst.

3. The ammonia decomposition catalyst of claim 1, wherein the ammonia decomposition catalyst has an ammonia decomposition rate of 98% or more at a temperature of 400 °C to 500 °C.

* * * * *